US006694834B2

(12) United States Patent
Bansbach et al.

(10) Patent No.: US 6,694,834 B2
(45) Date of Patent: Feb. 24, 2004

(54) CONTROL SYSTEM FOR TRANSFER CASE RANGE SHIFT

(75) Inventors: Eric A. Bansbach, Fayetteville, NY (US); William E. Smith, Liverpool, NY (US)

(73) Assignee: New Venture Gear, Inc., Troy, MI (US)

( * ) Notice: Subject to any disclaimer, the term of this patent is extended or adjusted under 35 U.S.C. 154(b) by 13 days.

(21) Appl. No.: 10/104,437

(22) Filed: Mar. 22, 2002

(65) Prior Publication Data

US 2002/0152824 A1 Oct. 24, 2002

(51) Int. Cl.[7] ............................................. F16H 63/04
(52) U.S. Cl. ........................... 74/335; 74/339; 192/84.6
(58) Field of Search ............................... 74/335, 336 R, 74/339; 475/149, 153; 192/84.6

(56) References Cited

U.S. PATENT DOCUMENTS 6,276,224 B1 * 8/2001 Ueda et al. .................... 74/335
6,481,304 B1 * 11/2002 Yoshioka et al. ............. 74/335
2002/0157491 A1 * 10/2002 Fukuda ......................... 74/335

* cited by examiner

*Primary Examiner*—Saul Rodiguez
*Assistant Examiner*—Dennis Abdelnour
(74) *Attorney, Agent, or Firm*—Harness, Dickey & Pierce P.L.C.

(57) ABSTRACT

In accordance with the present invention, a preferred method is disclosed for operating a transfer case synchronized range shift mechanism. The range shift mechanism can be selectively actuated for establishing a four-wheel high-range drive mode, a neutral mode, and a four-wheel low-range drive mode. The synchronized range shift mechanism is comprised of a first input gear system, a second input gear system, and an output gear system. The output gear system is comprised of a rotary output member that may be selectively engaged with either the first input gear system or the second input gear system, depending on which four-wheel-drive operating mode the vehicle operator selects. The range shift mechanism is further comprised of a synchronizing mechanism. The present invention discloses a novel method for controlling the speed of the range shift as a means for reducing the time it takes to perform the range shift.

39 Claims, 9 Drawing Sheets

CONTROL SYSTEM FOR TRANSFER CASE RANGE SHIFT

FIELD OF THE INVENTION

The present invention relates in general to transfer cases for use in four-wheel drive automotive vehicles, and more particularly, to a method for operating a transfer case synchronized range shift mechanism.

BACKGROUND OF THE INVENTION

The drivetrain in many light-duty and sport-utility vehicles includes a transfer case for transmitting drive torque to all four wheels of the vehicle, thereby establishing a four-wheel drive mode of operation. To accommodate differing road surfaces and conditions, some transfer cases are equipped with a gear reduction unit that allows the vehicle operator to selectively shift between four-wheel high-range and low-range drive modes. In many instances, however, the vehicle must be stopped before the transfer case can be shifted between the four-wheel high-range and low-range drive modes. For transfer cases that do not have a synchronized range shift mechanism, stopping the vehicle allows the relative velocity between the gears being moved into meshed engagement to be reduced to an acceptable level (i.e., synchronized) before initiating the range shift. Attempting to perform a range shift without first synchronizing the rotation of the gears may cause undesirable noise ("NVH") as well as physical damage to the transfer case.

There may be instances, however, where stopping the vehicle to perform a range shift is inconvenient, particularly upon encountering road conditions and surface terrains where maintaining the vehicle's rolling momentum would assist in overcoming the adverse conditions encountered. To alleviate this problem, some gear reduction units are adapted to permit the vehicle operator to shift between four-wheel high-range and low-range drive modes without having to stop the vehicle. One means for accomplishing this is by incorporating a device commonly known as a synchronizer into the range shift mechanism. A synchronizer is a device that temporarily prevents rotating gears from entering into meshed engagement with one another until after the synchronizer adjusts the rotational velocities of the gears so as to be substantially equal. Once the rotational velocities are substantially equal, the synchronizing mechanism allows the gears to enter into meshed engagement, thereby completing the gear shift.

Generally It is desirable to complete a range shift operation in as short a time period as possible. The speed at which a range shift can be completed is dependant on various factors, including the maximum speed at which the range shift mechanism can be operated as well as the speed at which the range shift mechanism should be operated during the synchronization process. Operating the range shift mechanism too quickly during the synchronization process may not allow sufficient time for synchronization to occur, which may result in undesirable and potentially damaging gear clashing. On the other hand, performing a range shift at too low of a shift speed will result in unnecessarily long shift durations. Prior shift mechanism designs have attempted to resolve this dilemma by limiting the speed of the range shift to a maximum shift speed at which synchronization can occur without causing excessive NVH. But since the shift velocity required for synchronization is often less than the maximum shift velocity at which the range shift mechanism can be operated, the time required to complete a range shift is still greater than if the range shift mechanism were operated at its maximum shift velocity. Accordingly, the time required to complete a range shift can potentially be reduced by allowing a synchronized range shift mechanism to be operated at a shift velocity greater than the shift velocity required for synchronization. Thus, a recognized need exists for developing a method for operating a synchronized range shift mechanism that is capable of exploiting the range shift mechanism's maximum operating speed while meeting the operational requirements of the synchronization process.

SUMMARY OF THE INVENTION

In accordance with the present invention, a preferred method is disclosed for operating a transfer case synchronized range shift mechanism. The range shift mechanism can be selectively actuated for establishing a four-wheel high-range drive mode, a neutral mode, and a four-wheel low-range drive mode. The synchronized range shift mechanism is comprised of a first input gear system, a second input gear system, and an output gear system. The output gear system is comprised of a rotary output member that may be selectively engaged with either the first input gear system or the second input gear system, depending on which four-wheel-drive operating mode the vehicle operator selects. The range shift mechanism is further comprised of a synchronizing mechanism. During a range shift, the synchronizing mechanism prevents the output gear system from meshing with the operator selected input gear system until the rotational velocity of both gear systems is substantially the same. The present invention discloses a novel method for controlling the speed of the range shift as a means for reducing the time it takes to perform the range shift while maintaining desired NVH quality.

In a preferred embodiment of the present invention, the distance over which the rotary output member travels between the four-wheel low-range shift position and a four-wheel high-range shift position is divided into multiple intervals. Over a first interval, the rotary output member is accelerated to a first shift velocity that is greater than a shift velocity at which synchronization will occur. The rotary output member is then decelerated over a second shift interval to the shift velocity required for synchronization. Over a third shift interval, the rotary output member is accelerated to a third shift velocity that is greater than the shift velocity required for synchronization. Mechanical detents are used to limit the range of travel of the range shift mechanism. PID control may be used in combination with or in place of mechanical detents to control the end of shift travel.

In another preferred embodiment of the present invention, the rotary output member is operated over a first shift interval at a first shift velocity that is greater than the shift velocity that is necessary for synchronization to occur. Over a second shift interval, the rotary output member is operated at a second shift velocity that is equal to or less than the shift velocity required for synchronization. Over a third shift interval, the rotary output member is operated at a third shift velocity that is greater than the shift velocity required for synchronization to occur. Mechanical detents are used to limit the range of travel of the range shift mechanism. PID control may be used in combination with or in place of mechanical detents to control the end of shift travel.

In yet another preferred embodiment of the present invention, the distance over which the rotary output member travels between the four-wheel low-range shift position and a four-wheel high-range shift position is divided into multiple intervals. Over a first interval, the rotary output member is accelerated to a first shift velocity that is greater than a shift velocity at which synchronization will occur. The rotary output member is then decelerated over a second shift interval to a shift velocity that is less than the shift velocity required for synchronization. Over a third shift interval, the rotary output member is accelerated to a third shift velocity that is substantially equal to the shift velocity required for synchronization. The rotary output member is then accelerated over a fourth shift interval to a fourth shift velocity that is greater than the shift velocity required for synchronization. Over a fifth shift interval, the rotary output member is decelerated to a shift velocity that is less than the shift velocity required for synchronization. Mechanical detents are used to limit the range of travel of the range shift mechanism. PID control may be used in combination with or in place of mechanical detents to control the end of shift travel.

Further areas of applicability of the present invention will become apparent from the detailed description provided hereinafter. It should be understood that the detailed description with specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In general this invention relates to a method for performing a range shift of a transfer case having a synchronized range shift mechanism. Although the present invention makes specific reference to a transfer case, it shall be appreciated that this invention is equally applicable to other gear shift mechanisms incorporating a synchronized shift mechanism. Accordingly, a detailed description of the present invention shall be preceded by a description of the components and operation of a exemplary transfer case.

Figure 1:
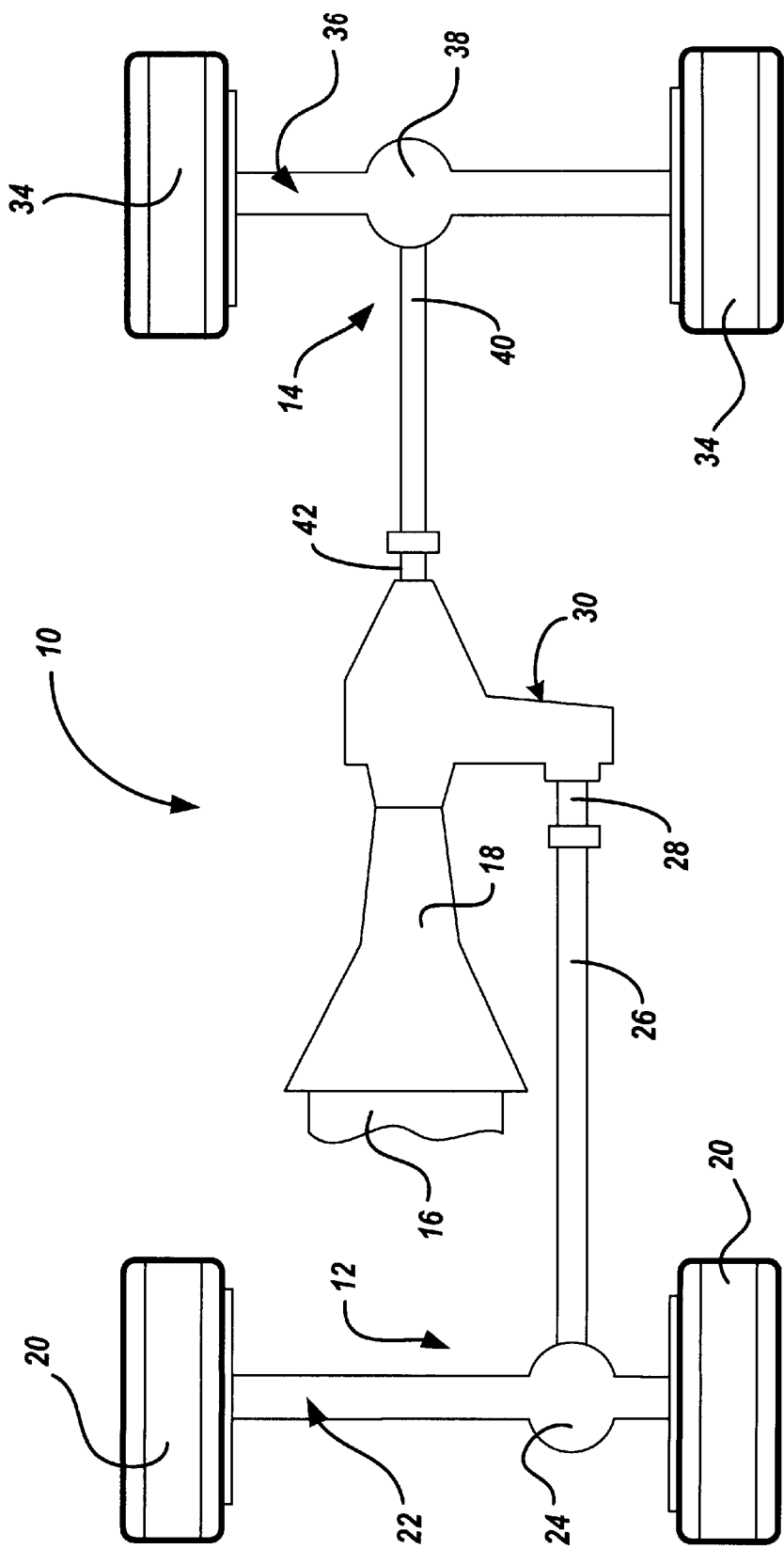
FIG. 1 is an illustration of a drivetrain of a four-wheel drive motor vehicle equipped with a transfer case.

Referring to FIG. 1 of the drawings, a drivetrain 10 for a four-wheel drive vehicle is shown. Drivetrain 10 includes a front driveline 12 and a rear driveline 14. A power source, such as an engine 16 (partially shown), provides drive torque to the front and rear drivelines through a transmission 18. The transmission 18 may be either a manual or automatic shifting type. Front driveline 12 is shown to include a pair of front wheels 20 connected to opposite ends of a front axle assembly 22 having a front differential 24. Front differential 24 is coupled to one end of a front propshaft 26, the opposite end of which is coupled to a front output shaft 28 of a transfer case 30. Similarly, rear driveline 14 includes a pair of rear wheels 34 connected to opposite ends of a rear axle assembly 36 having a rear differential 38. Rear differential 38 is coupled to one end of a rear propshaft 40, the opposite end of which is coupled to a rear output shaft 42 of transfer case 30.

Figure 2:
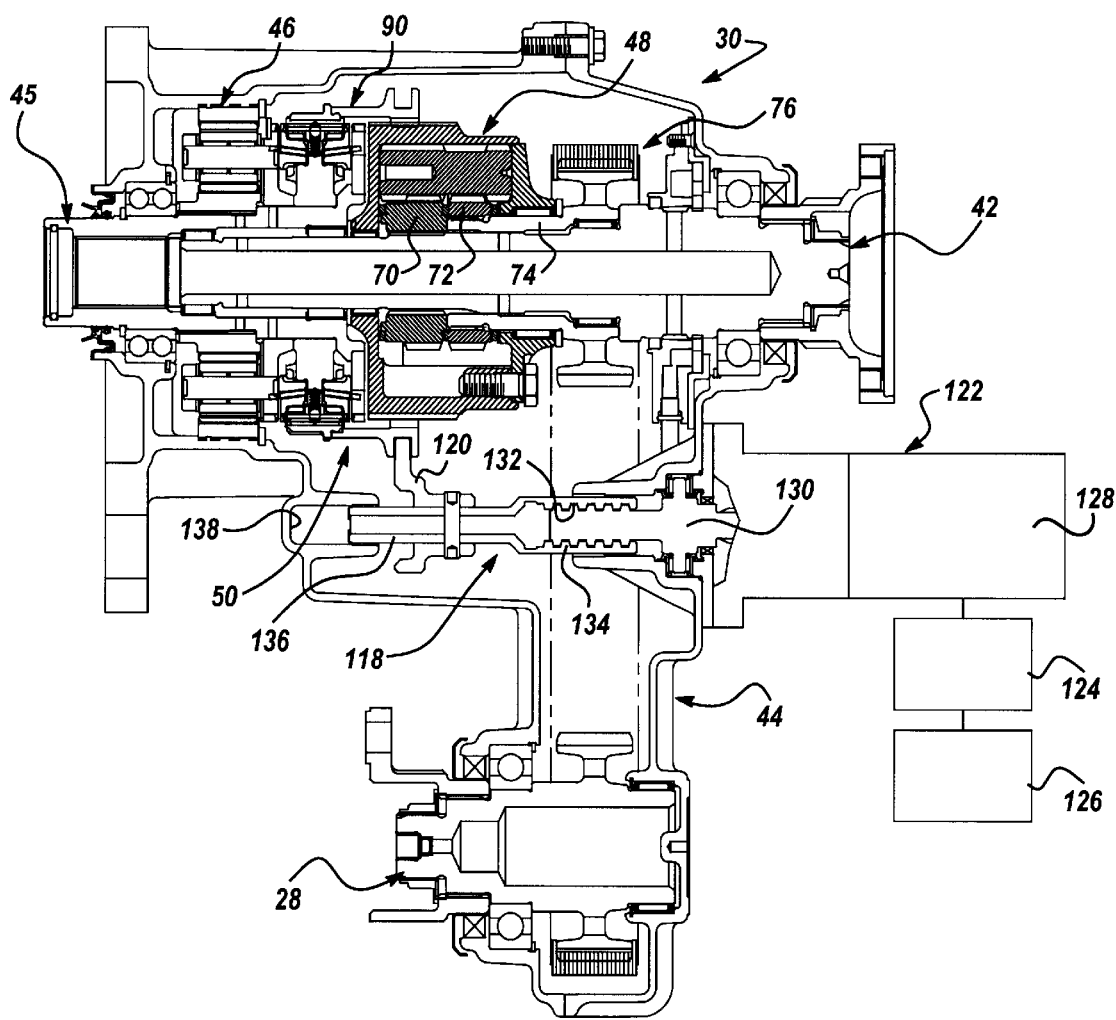
FIG. 2 is a sectional view of an exemplary transfer case equipped with a synchronized range shift mechanism.
Figure 3:
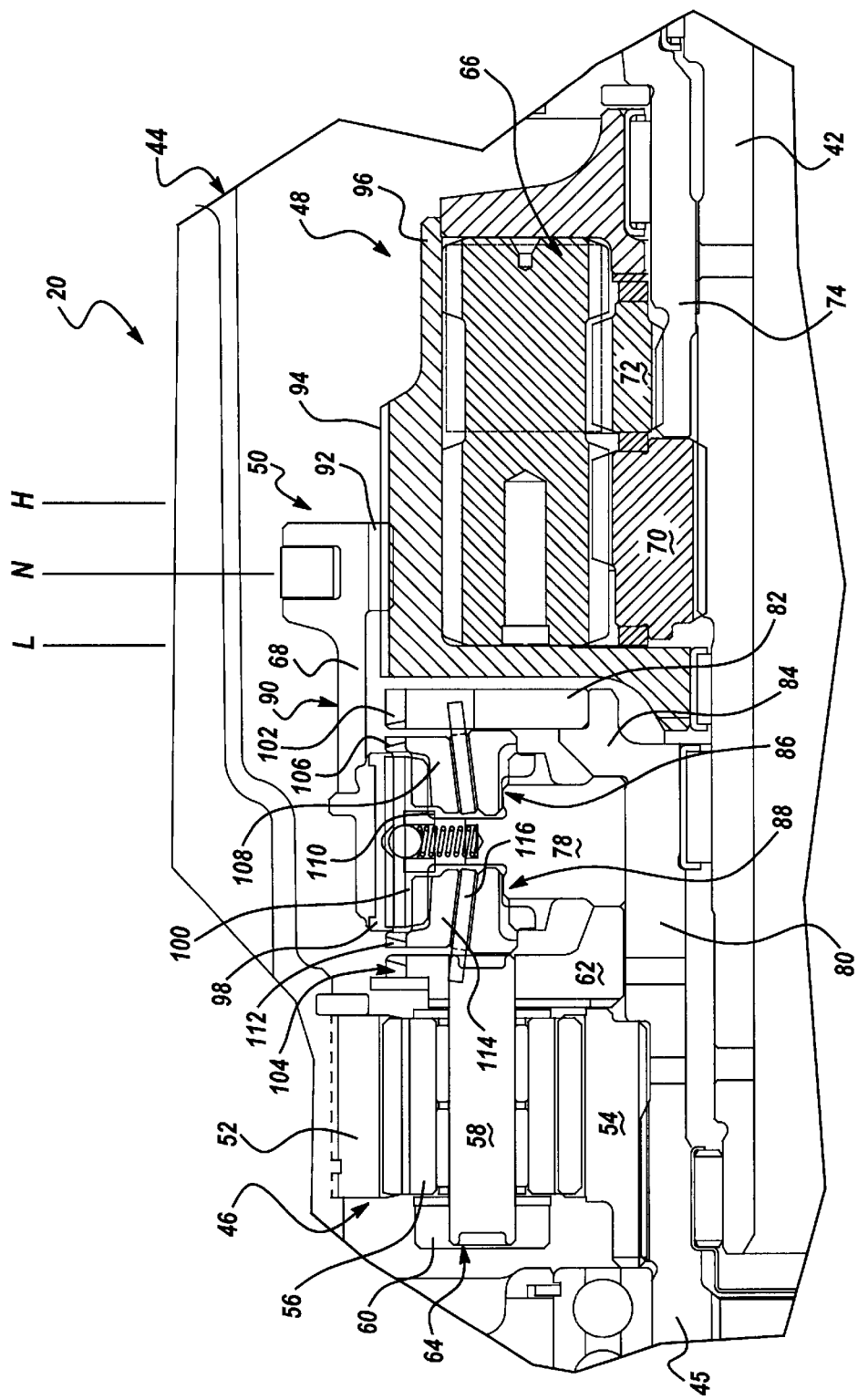
FIG. 3 is a partial sectional view of the synchronized range shift mechanism shown in FIG. 2.

Referring to FIGS. 2 and 3, transfer case 30 includes a housing assembly 44 and an input shaft 45 rotatably supported from housing assembly 44. Input shaft 45 is adapted for connection to an output shaft (not shown) of transmission 18, such that both are rotatably driven by engine 16. Transfer case 30 is also shown to include a planetary gear assembly 46, an interaxle differential 48, and a synchronized range shift mechanism 50.

Referring to FIG. 3, planetary gear assembly 46 includes a ring gear 52 fixed to housing assembly 44 and a sun gear 54 fixed for rotation with input shaft 45. A set of pinion gears 56 are rotatably supported on a set of pinion shafts 58. Pinion gears 56 mesh with sun gear 54 and ring gear 52. Each pinion shaft 58 extends between a front carrier ring 60 and a rear carrier ring 62 that are interconnected to define a planet carrier 64.

Referring to FIGS. 2 and 3, interaxle differential 48 functions to prevent speed differentiation between the front output shaft 28 and the rear output shaft 42 of transfer case 30. Interaxle differential 48 includes a carrier assembly 66, which is driven by the range sleeve 68. Interaxle differential 48 contains two outputs for directing torque to the front and rear drive wheels (elements 20 and 34) of the vehicle. A sun gear 70 is meshed with rear output shaft 42 for transferring drive torque to rear wheels 34 of the vehicle. Similarly, a second sun gear 72 is meshed with a transfer shaft 74 for transferring drive torque to the front wheels 20 of the vehicle via a transfer mechanism 76.

Referring to FIG. 3, the synchronized range shift mechanism 50 is shown to include a clutch hub 78 rotatably supported on a tubular segment 80 of input shaft 45, a clutch plate 82 fixed to an annular end segment 84 of input shaft 45, a first synchronizer assembly 86 disposed between clutch hub 78 and clutch ring 82, and a second synchronizer assembly 88 disposed between clutch hub 78 and rear carrier ring 62. Rear carrier ring 62 is shown journalled on the tubular segment 80 of input shaft 45, with clutch hub 78 axially restrained between the annular end segment 84 and rear carrier ring 62.

Synchronized range shift mechanism 50 also includes a range clutch 90, which is comprised of a range sleeve 68 having a first set of internal clutch teeth 92 that are maintained in constant mesh with a set of external teeth 94 formed on drum housing 96 of interaxle differential 48. Range sleeve 68 also includes a second set of internal clutch teeth 98, which are maintained in constant mesh with a set of external teeth 100 formed on clutch hub 78. Range sleeve 68 is mounted for rotation with drum housing 96 and clutch hub 78, but is permitted to slide axially in either direction.

The synchronized range shift mechanism 50 is operable to establish either a first or second drive connection between input shaft 45 and interaxle differential 48. The first drive connection is established by range clutch 90 coupling interaxle differential 48 to clutch plate 82. The first drive connection defines a high-range drive mode in which interaxle differential 48 is driven at the same rotational speed as input shaft 45. The second drive connection is established by range clutch 90 coupling interaxle differential 48 to rear carrier ring 62. The second drive connection defines a low-range drive mode in which interaxle differential 48 is driven at a rotational speed that is less than that of the input shaft 45. A neutral mode is established when range clutch 90 uncouples interaxle differential 48 from both clutch plate 82 and rear carrier ring 62.

The synchronized range shift mechanism 50 is operable to allow transfer case 30 to be shifted between the high-range and low-range drive modes while the vehicle is in motion. This is accomplished by synchronizing the rotational speed of range clutch 90 with the rotational speed of rear carrier ring 62 or clutch ring 82, depending on the drive range the vehicle operator selects. With range clutch 90 in a neutral position (denoted by shift position N), clutch teeth 98 of range sleeve 68 are disengaged from meshed engagement with teeth 102 on clutch ring 82 and teeth 104 on rear carrier ring 62.

A range shift from the low-range to high-range drive mode is accomplished by sliding range clutch 90 axially toward the high-range position (denoted by shift position H). Initiating a high-range shift actuates the first synchronizer assembly 86, which is operable for causing speed synchronization between range clutch 90 and clutch plate 82. When the speed synchronization process first commences, a set of external teeth 106 on a first blocker ring 108 are misaligned with teeth 98 of range sleeve 68. The misalignment prevents teeth 98 on range sleeve 68 from moving into meshed engagement with teeth 102 on clutch plate 82 until after speed synchronization is achieved. Continued axial movement of range clutch 90 causes first blocker ring 108 to move axially toward clutch plate 82 and into frictional engagement with a first cone synchronizer 110 that is fixed for rotation with clutch plate 82. The frictional drag created by engaging first blocker ring 108 with cone synchronizer 110 creates a rotational torque that acts to decrease the rotational velocity of the faster moving part while increasing the rotational velocity of the slower moving part. This process continues until the rotational speed differential between range clutch 90 and clutch plate 82 is less than some determined value.

Once the speed synchronization process is completed, clutch teeth 98 on range sleeve 68 are permitted to move through teeth 106 of a blocker ring 108 and into meshed engagement with teeth 102 on clutch ring 82. With range clutch 90 situated at the H shift position, drum housing 96 of interaxle differential 48 rotates at the same speed as input shaft 45. This connection establishes the first drive connection, being a full-time four-wheel high-range drive mode.

A four-wheel low-range drive-mode is established in a manner similar to that used to establish the four-wheel high-range drive mode. Continuing to refer to FIG. 3, a range shift from the high-range drive mode to the low-range drive mode is accomplished by sliding range clutch 90 axially toward the low-range position (denoted by shift position L). Initiating a low-range shift actuates a second synchronizer assembly 88, which is operable for causing speed synchronization between range clutch 90 and rear carrier ring 62. When the speed synchronization process first commences, a set of external teeth 112 on a second blocker ring 114 are misaligned with teeth 98 of range sleeve 68. The misalignment prevents teeth 98 on range sleeve 68 from moving into meshed engagement with teeth 104 on rear carrier ring 62 until after speed synchronization is achieved. Continued axial movement of range clutch 90 causes second blocker ring 114 to move axially toward rear carrier ring 62 and into frictional engagement with a second cone synchronizer 116 that is fixed for rotation with rear carrier ring 62. The frictional drag created by engaging second blocker ring 114 with second cone synchronizer 116 creates a rotational torque that acts to decrease the rotational velocity of the faster moving part while increasing the rotational velocity of the slower moving part. This process continues until the rotational speed differential between range clutch 90 and rear carrier ring 62 is less than some determined value.

Once the speed synchronization process is completed, clutch teeth 98 on range sleeve 68 are permitted to move through teeth 112 of the second blocker ring 114 and into meshed engagement with teeth 104 on rear carrier ring 62. With range clutch 90 situated at the L position, drum housing 96 of interaxle differential 48 rotates at the same speed as pinion shafts 58 rotate about sun gear 54, which is at a reduced speed ratio relative to input shaft 45. This connection establishes the second drive connection, being a full-time four-wheel low-range drive mode.

Referring to FIG. 2, movement of range sleeve 90 between the H, N, and L drive range positions is accomplished by means of a shift system 118. Shift system 118 is comprised of a range fork 120 that is coupled to range sleeve 68, a range shift actuator 122 for causing axial movement of range fork 120, a shift controller 124 for controlling operation of range shift actuator 122, and a range selector 126 from which the vehicle operator can selectively actuate a range shift.

Range shift actuator 122 is comprised of a gearmotor 128 having a rotary output screw 130 on which external threads 132 are formed. Gearmotor 128 is preferably, but not limited to, a direct current electric motor ("d-c motor") having an output speed reducing gearbox. The external threads 132 are in meshed engagement with a set of internal threads 134 formed in one end of a sector shaft 136. Another end of sector shaft 136 is supported in a housing socket 138. Range fork 120 is fixed to sector shaft 136, such that bi-directional rotation of output screw 130 caused by actuating gearmotor 128 results in bi-directional axial translation of sector shaft 136 and range fork 120, which in turn moves range clutch 90 between its three distinct range positions.

Shift controller 124 controls the operation of gearmotor 128. As is conventional, shift controller 124 includes a central processing unit (CPU) that executes a control algorithm stored in the shift controller's memory (not shown). Shift controller 124 controls the rotational speed, direction of rotation, and number of revolutions that gearmotor 128 is to complete in response to a control signal received from range selector 126. Shift controller 124 will preferably use a method known as pulse-width-modulation (PWM) to control the rotational velocity of gearmotor 128.

There are various known methods for controlling the rotational velocity of a d-c motor. One method consists of varying the magnitude of the voltage being applied to the electric motor. That method, however, may require the use of relatively complex and costly electrical circuitry. A simpler and more cost effective method of controlling the rotational velocity of the motor consists of turning the electrical signal on and off in a series of pulses known as pulse-width-modulation (PWM). The time averaged voltage determines the voltage realized by the electrical motor.

Figure 4:
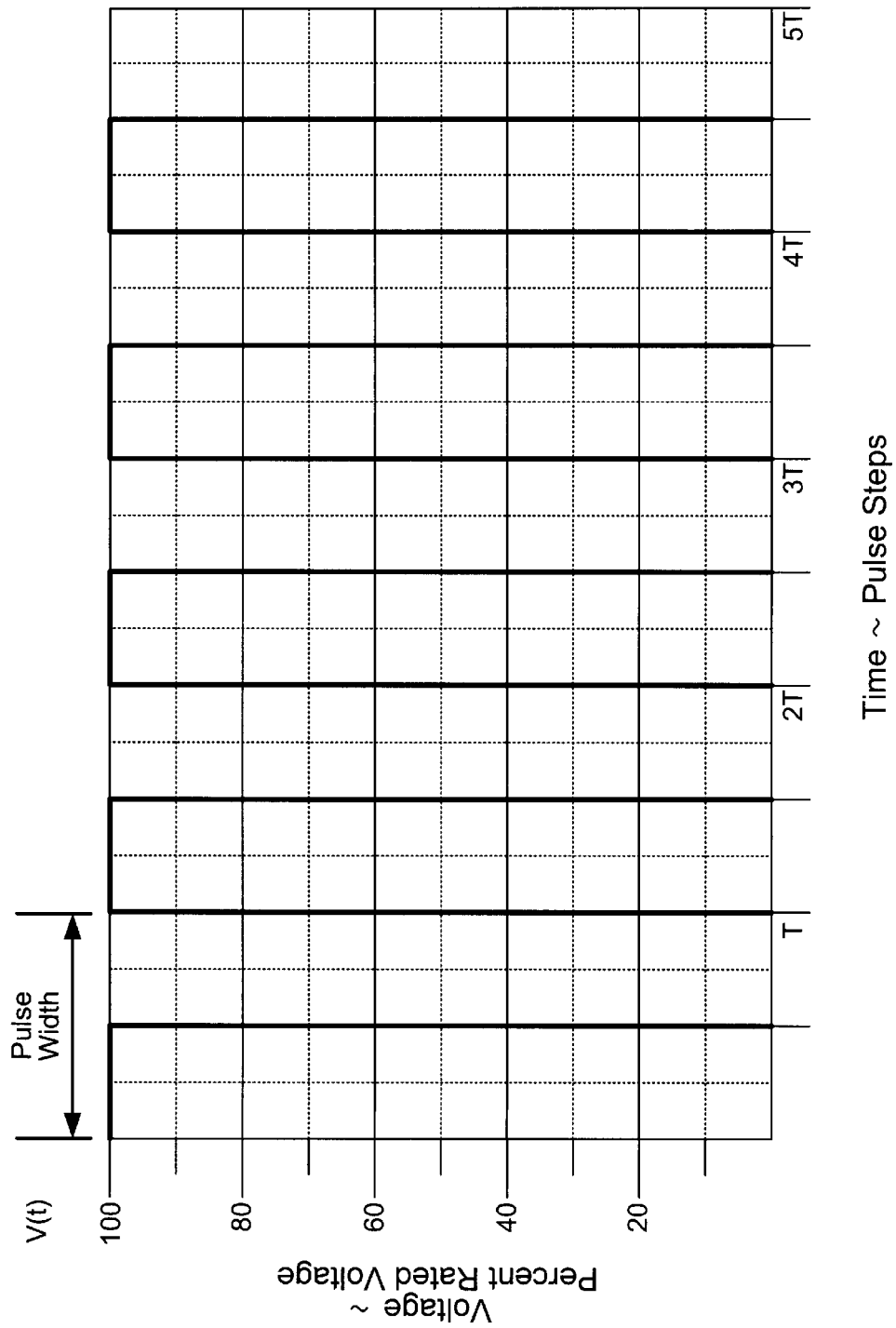
FIG. 4 is a graphical depiction of a pulse-width-modulated voltage pulse train.

Referring to FIG. 4, there is shown an exemplary PWM voltage pulse train. PWM is method for varying the electrical voltage level by simply turning the electrical signal on and off in a series of pulses. The magnitude of the pulse-width-modulated voltage is determined by the percentage of each pulse width that the electrical signal is turned on. For example, if the electrical signal is turned on for 50 percent of the pulse width, the resulting pulse-width-modulated voltage would be 50 percent of the source voltage. Since PWM only involves turning on and off the electrical signal in a series of pulses, the electrical circuitry used to produce the desired voltage pulse train is less complex than the electrical circuitry used to regulate voltage by other means.

The speed at which range clutch 90 can be moved from one range shift position to another depends, in part, on the magnitude of the axial force applied to the first or second blocker rings (elements 108 and 114 respectively) during the synchronization process. The magnitude of the axial force ("synchronization force") is a function of the speed at which range clutch 90 is moved between shift positions ("shift velocity"). A higher shift velocity generally equates to a larger synchronization force being applied to the blocker ring during the synchronization process. If the synchronization force is too high, however, teeth 98 of range sleeve 68 will pass through the blocker ring teeth before speed synchronization is achieved, which could cause undesirable NVH and damage to transfer case 30. On the other hand, if the synchronization force is too low (which corresponds to a slower shift velocity), it will take longer than necessary to complete the range shift.

Former range shift mechanisms typically utilized a constant shift velocity throughout the range shift sequence, with the shift velocity being limited to a shift velocity required for synchronization. Since the shift velocity required for synchronization is generally lower than the maximum shift velocity at which the shift system can be operated, using a constant shift velocity will generally result in unnecessarily long shift times. The present invention resolves this problem by utilizing a method for operating the range shift mechanism that varies the shift velocity throughout the shift sequence.

Figure 5:
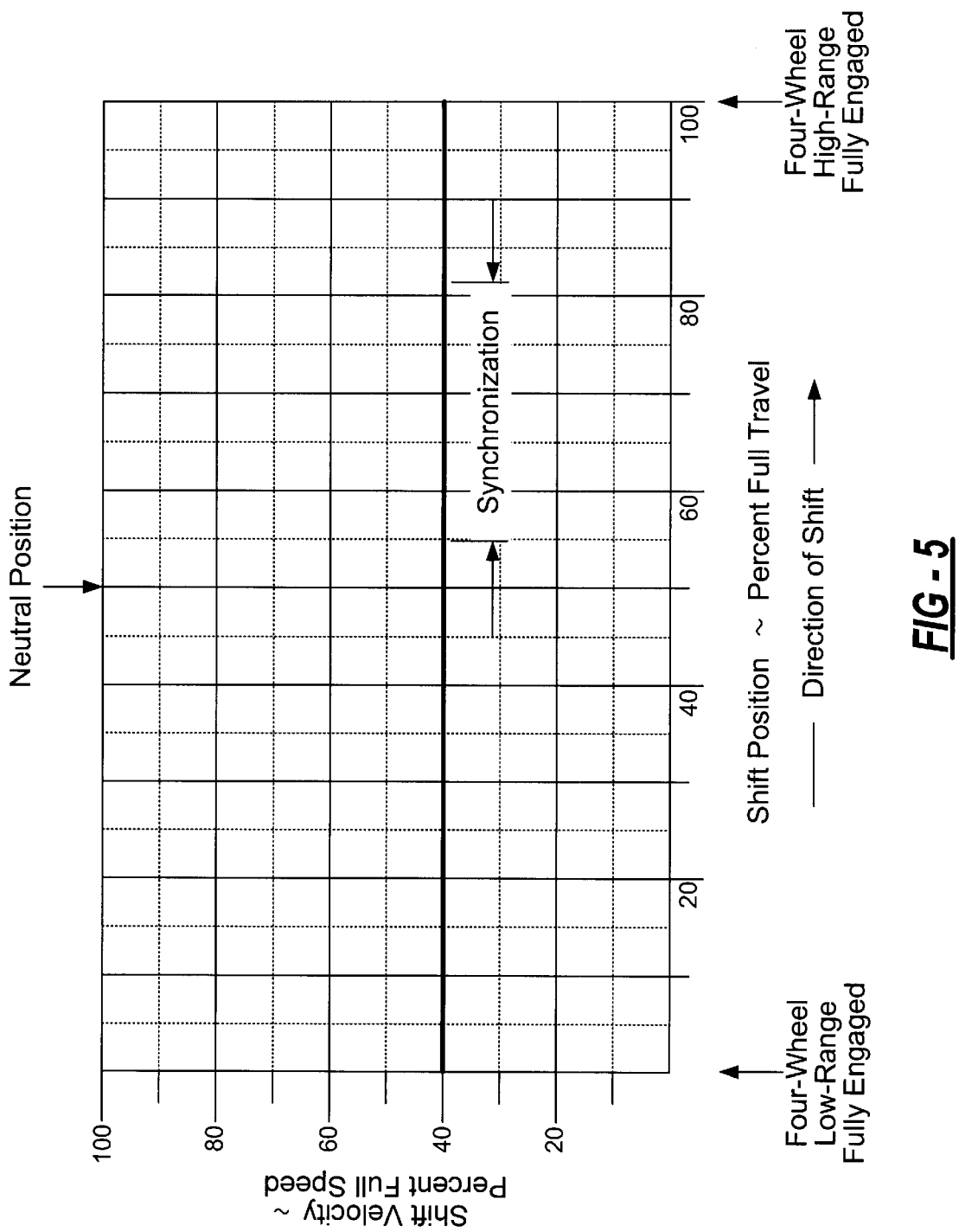
FIG. 5 is a graphical depiction of shift velocity as a function of shift position for a typical range shift, wherein the shift velocity remains constant throughout the range shift.

Referring to FIG. 5, there is shown a graphical depiction of shift velocity as a function of shift position for a range shift from four-wheel low-range drive mode to four-wheel high-range drive mode utilizing a constant shift velocity. The shift velocity, plotted vertically along the graph's y-axis, is specified as a percentage of a maximum speed at which synchronized shift mechanism 50 can be operated. The shift position, which corresponds to the position of range clutch 90 along the distance between the low-range shift position (position L) and the high-range shift position (position H), is plotted horizontally along the graph's x-axis, and is specified as a percentage of full travel.

Continuing to refer to FIG. 5, synchronization is shown to occur in the 55 to 80 percent of full travel region. The shift velocity during synchronization is shown to be substantially equal to 40 percent of full speed. It shall be appreciated, however, that the region over which synchronization occurs and/or the shift velocity during the synchronization process, may differ from that shown in FIG. 5, and will depend in large part on the design of the particular range shift mechanism being used. As mentioned previously, the synchronization process generally occurs at a shift velocity that is less than the maximum velocity at which synchronized range shift mechanism 50 can be operated. As a consequence, operating range shift mechanism 50 at a shift velocity required for synchronization will likely result in significantly longer shift times than if the range shift mechanism 50 was operated at 100 percent of full speed.

To reduce the time required to complete a range shift from that which is achievable using a constant shift velocity, the present invention provides for the shift velocity to vary throughout the shift interval. This permits certain portions of the shift interval to be traversed at a higher shift speed than may be desirable for synchronization.

Figure 6:
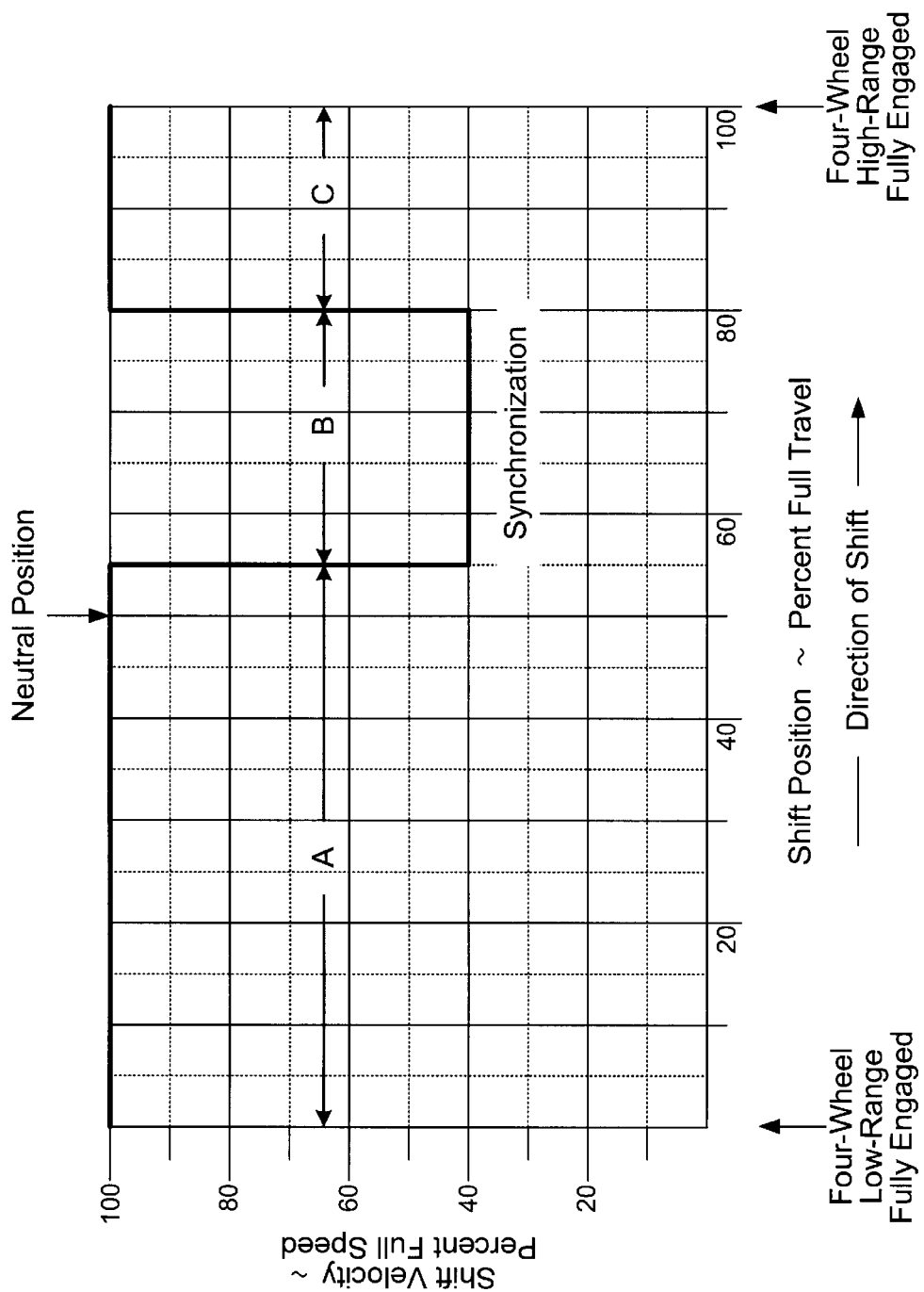
FIG. 6 is a graphical depiction of a preferred embodiment of the present invention showing a method for varying the shift velocity of the transfer case range shift mechanism.

Referring to FIG. 6, there is shown a shift velocity profile utilizing the method of the present invention. The shift velocity profile is for a range shift from four-wheel low-range drive mode to the four-wheel high-range drive mode.

Continuing to refer to FIG. 6, the range shift sequence is divided into three intervals, "A", "B" and "C". The first shift interval "A" consists of moving range clutch 90 from the four-wheel low-range fully engaged drive position to a shift position just prior to where the synchronization process commences. The four-wheel low-range fully engaged drive position is established by positioning range clutch 90 at the low-range position (position L). In this position, clutch teeth 98 on range sleeve 68 are in meshed engagement with the external teeth 100 formed on clutch hub 78 and teeth 104 on rear carrier ring 62. Gearmotor 128, upon receiving a control signal from shift controller 124, commences operating at its maximum rotational velocity. This in turn causes range fork 120 to move range clutch 90 toward the neutral position (position N). Moving range clutch 90 from the low-range shift position to the neutral shift position causes clutch teeth 98 on range sleeve 68 to disengage from teeth 104 on rear carrier ring 62. The process of disengaging range sleeve 68 from rear carrier ring 62 does not actuate the synchronizing mechanism and can therefore proceed at a maximum shift velocity (i.e., 100 percent of full speed).

As the range shift continues, range shift actuator 122 proceeds to move range clutch 90 from the neutral position towards the high-range shift position (position H). Moving range clutch 90 from the neutral position to the high-range shift position activates the synchronizing mechanism, which begins synchronizing the rotational velocities of range clutch 90 and clutch ring 82. The synchronization process occurs over shift interval "B".

At the start of the synchronization process (shift interval "B"), shift controller 124 instructs gearmotor 128 to operate at a reduced rotational velocity. This in turn causes range clutch 90 to operate at a reduced shift velocity. As discussed previously, the shift velocity during synchronization is a function of the desired synchronization force. The shift velocity during the synchronization process (shift interval "B") is shown in FIG. 6 to be 40 percent of full speed. However, once again, the skilled artisan will appreciate that the shift velocity during the synchronization process may vary significantly from that which is shown in FIG. 6, and will depend in large part on the configuration of the synchronizing mechanism that is actually used.

Upon completion of the synchronization process (shift interval "B"), clutch teeth 98 on range sleeve 68 are permitted to pass through teeth 106 of blocker ring 108. The range shift is completed by moving range clutch 90 to the four-wheel high-range fully engaged shift position (shift interval "C"). The four-wheel high-range fully engaged drive position is established by positioning range clutch 90 at the high-range shift position (position H). In this position, clutch teeth 98 on range sleeve 68 are in meshed engagement with the external teeth 100 formed on clutch hub 78 and teeth 102 on clutch plate 82. Since the synchronization process is completed, shift interval "C" can proceed at a higher shift velocity than may be desirable for synchronization. The shift velocity over shift interval "C" will preferably be 100 percent of full speed.

The shift velocity profile shown in FIG. 6 uses mechanical detents to locate the end of shift travel for range clutch 90 (i.e., shift positions L and H). Mechanical detents allow range clutch 90 to move at 100 percent of full speed through to the end of the shift range. A method known as PID may also be used to locate the end of shift travel. PID is a method in which the position of range clutch 90 is tracked electronically. As range clutch 90 approaches the end of shift position, the PID algorithm takes control of the operation of gearmotor 128. The PID algorithm decelerates the gearmotor 128 in a predetermined manner and stops the rotation of gearmotor 128 when range clutch 90 reaches the end of the shift travel.

Figure 7:
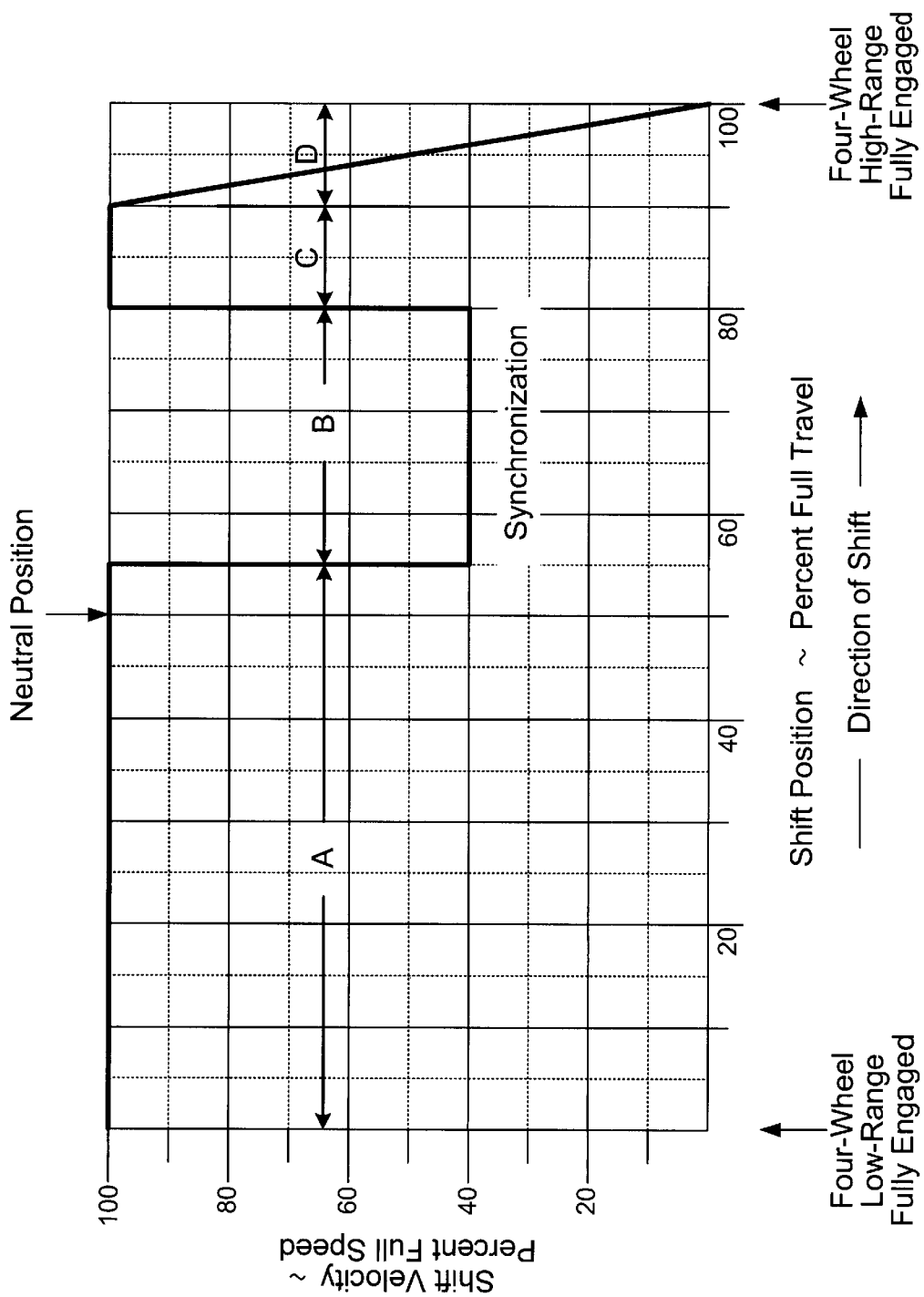
FIG. 7 is a graphical depiction of a shift velocity profile that is similar to that which is shown in FIG. 6, but which also incorporates PID control of the transfer case range shift mechanism.

Referring to FIG. 7, there is shown an exemplary shift velocity profile using PID to establish the end of shift position. The graph describes a shift velocity for a range shift from the four-wheel low-range drive mode to the four-wheel high-range drive mode. The shift velocity profile shown in FIG. 7 is similar to the shift velocity profile shown in FIG. 6. The only difference is that the shift velocity over shift interval "C" is no longer constant, but rather, PID is used to ramp the shift velocity down to zero at the end of the range shift.

Continuing to refer to FIG. 7, the range shift sequence is divided into four shift intervals, "A", "B", "C", and "D". Shift intervals "A" and "B" have the same velocity profile as the corresponding shift intervals in FIG. 6. Shift interval "C" commences at substantially the same shift position as shift interval "C" in FIG. 6, but stops when PID takes control of the operation of gearmotor 128. PID control of gearmotor 128 is shown in FIG. 7 to commence at 90 percent of full travel. The skilled artisan, however, will appreciate that the PID controlled shift velocity profile shown in FIG. 7 is merely exemplary, and that PID controlled shift velocity profiles that differ from that shown in FIG. 7 nevertheless fall within the scope of this invention.

Figure 8:
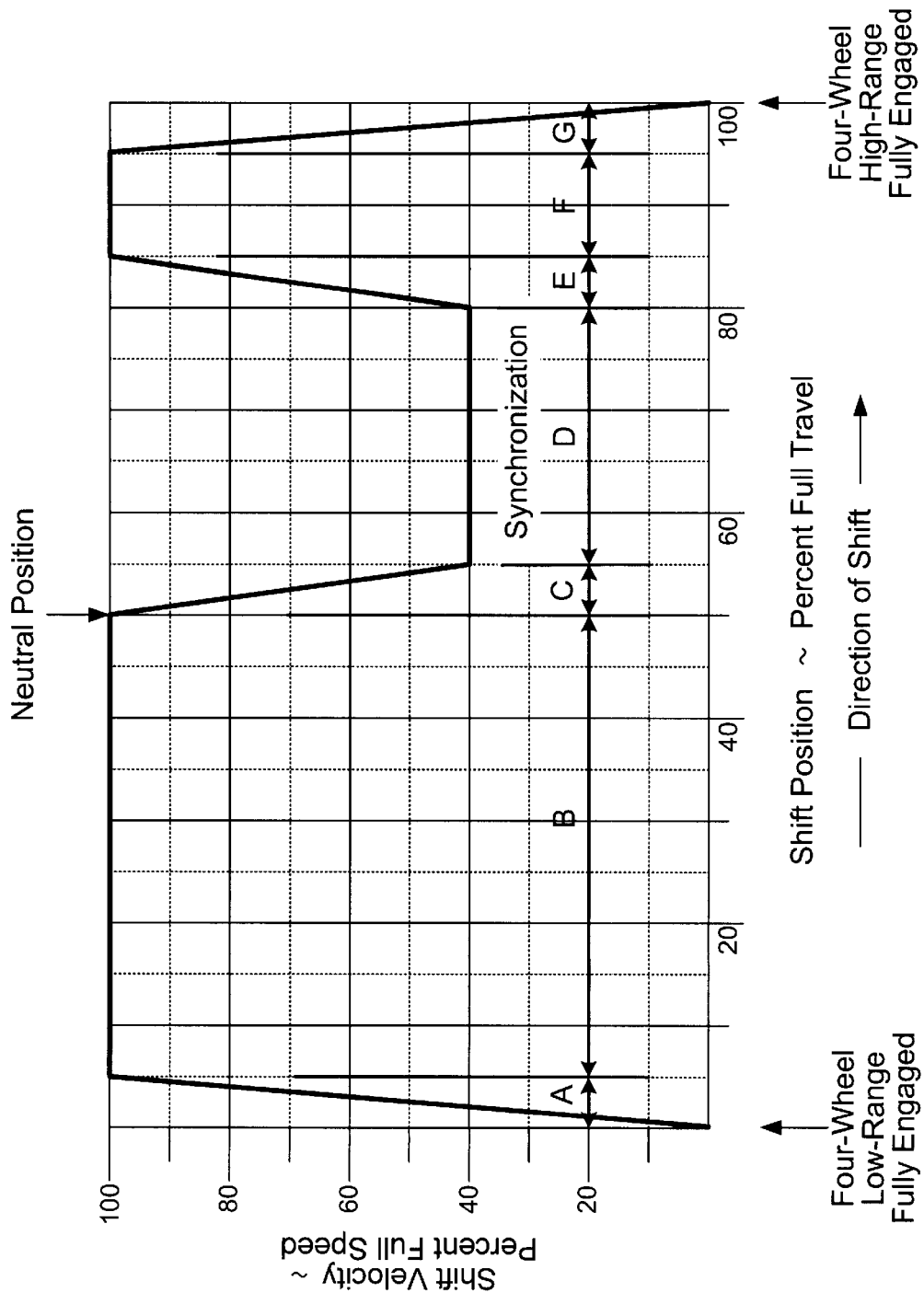
FIG. 8 is a graphical depiction of another embodiment of the method of the present invention for varying the shift velocity of the transfer case range shift mechanism.

Referring now to FIG. 8, there is shown a graph of a shift velocity profile for yet another embodiment of the present invention. The graph describes a shift velocity profile for a range shift from the four-wheel low-range drive mode to the four-wheel high-range drive mode. The shift velocity profile consists of accelerating range clutch 90, over a shift interval "A", to a shift velocity that is preferably 100 percent of full speed, but as a minimum, is greater than the shift velocity required for synchronization. Range clutch 90 is then decelerated over a shift interval "C" to a shift velocity that is preferably equal to the shift velocity required for synchronization. Upon completion of the synchronization process (shift interval "D"), range clutch 90 is accelerated over a shift interval "E" to a shift velocity that is preferably 100 percent of full speed, but as a minimum, is greater than the shift velocity required for synchronization. The range shift is completed by decelerating range clutch 90, over a shift interval "G", to a shift velocity that is substantially equal to zero. PID, or a combination of PID and mechanical detents, will preferably be used to control the deceleration and positioning of range clutch 90 over shift interval "G".

Figure 9:
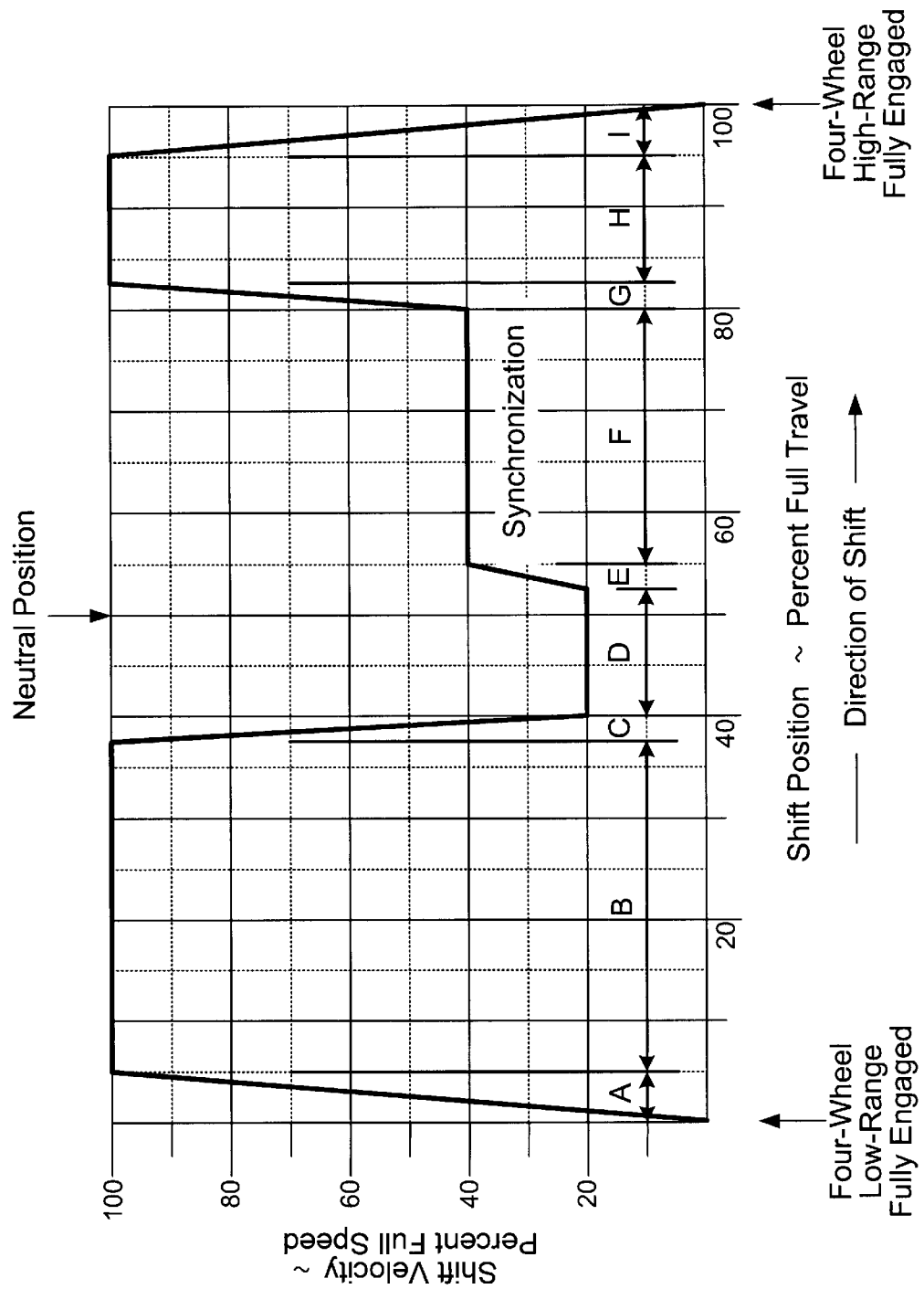
FIG. 9 is a graphical depiction of yet another embodiment of the method of the present invention for varying the shift velocity of the transfer case range shift mechanism.

Referring now to FIG. 9, there is shown a graph of a shift velocity profile for yet another embodiment of the present invention. The graph describes a shift velocity profile for a range shift from the four-wheel low-range drive mode to the four-wheel high-range drive mode. The shift velocity profile consists of accelerating range clutch 90, over a shift interval "A", to a shift velocity that is preferably 100 percent of full speed, but as a minimum, is greater than a shift velocity required for synchronization. Range clutch 90 is then decelerated over a shift interval "C" to a shift velocity that is preferably less than, but in no event greater than, the shift velocity required for synchronization. Range clutch 90 is then accelerated, over shift interval "E", to a shift velocity that is preferably equal to, but in no event greater than, the shift velocity required for synchronization. Upon completion of the synchronization process (shift interval "F"), range clutch 90 is accelerated over shift interval "H" to a shift velocity that is preferably 100 percent of full speed, but as a minimum, is greater than the shift velocity required for synchronization. The range shift is completed by decelerating range clutch 90, over a shift interval "I", to a shift velocity that is substantially equal to zero. PID, or a combination of PID and mechanical detents, will preferably be used to control the deceleration and positioning of range clutch 90 over shift interval "I".

The foregoing detailed description of various preferred embodiments of the present invention was limited to describing range shifts from the four-wheel low-range drive mode to the four-wheel high-range drive mode. The skilled artisan, however, will appreciate that the velocities profiles herein described are equally applicable when shifting from the four-wheel high-range drive mode to the four-wheel low-range drive mode.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A method for performing a synchronized gear shift of a gear system comprised of a first rotary input member, a second rotary input member, a rotary output member movable between a first position where it is coupled to the first rotary input member and a second position where it is coupled to the second rotary input member, and a synchronizing mechanism for synchronizing the rotational speed of the rotary output member with the rotational speed of the second rotary input member while the rotary output member moves from its first position toward its second position at a variable shift velocity, which steps comprise:

accelerating the rotary output member to a first shift velocity that is greater than a synchronization shift velocity, wherein the synchronization shift velocity corresponds to the shift velocity of the rotary output member during the period of time in which rotational speed synchronization between the second rotary input member and the rotary output member occurs;

decelerating the rotary output member to a second shift velocity that is less than the synchronization shift velocity; and accelerating the rotary output member to a third shift velocity that is substantially equal to the synchronization shift velocity.

2. The method of claim 1, wherein the first shift velocity occurs within a first shift interval.

3. The method of claim 2, wherein the second shift velocity extends through a neutral position.

4. The method of claim 3, wherein the neutral position substantially coincides with a position at which the rotary output member first becomes fully disengaged from the first rotary input member.

5. The method of claim 3, wherein the neutral position substantially coincides with a position at which the synchronizing mechanism first begins synchronizing the rotational speed of the second rotary input member with that of the rotary output member.

6. The method of claim 1, wherein the first shift velocity is substantially equal to a maximum shift velocity at which the gear system can move the rotary output member.

7. The method of claim 1, wherein the synchronization shift velocity is determined from at least one predetermined vehicle operating parameter.

8. The method of claim 7, wherein the predetermined vehicle operating parameters include at least one parameter selected from vehicle speed, shaft speed, speed differential and transmission gear.

9. The method of claim 1, wherein the third velocity is substantially equal to a maximum shift velocity at which the gear system can move the rotary output member.

10. The method of claim 1, wherein the second shift velocity occurs within a second shift interval.

11. The method of claim 10, wherein the second shift interval extends from a neutral position to a position intermediate the neutral position and the second position.

12. The method of claim 11, wherein the neutral position substantially coincides with a position at which the rotary output member first becomes fully disengaged from the first rotary input member.

13. The method of claim 11, wherein the neutral position substantially coincides with a position at which the synchronizing mechanism first begins synchronizing the rotational speed of the second rotary input member with that of the rotary output member.

14. The method of claim 1, wherein the third shift velocity occurs within a third shift interval.

15. The method of claim 14, wherein the third shift interval extends from a position intermediate a neutral position to the second position.

16. The method of claim 15, wherein the location of the second position is established by means of mechanical detents.

17. The method of claim 15, wherein the location of the second position is established by means of PID.

18. The method of claim 15, wherein the location of the second position is established by means of mechanical detents and PID.

19. The method of claim 15, wherein the neutral position substantially coincides with a position at which the rotary output member first becomes fully disengaged from the first rotary input member.

20. The method of claim 15, wherein the neutral position substantially coincides with a position at which the synchronizing mechanism first begins synchronizing the rotational speed of the second rotary input member with that of the rotary input member.

21. The method of claim 1, wherein the second and third shift velocities are substantially equal.

22. A method for performing a synchronized gear shift of a gear system comprised of a first rotary input member, a second rotary input member, a rotary output member movable from a first position where it is coupled to the first rotary input member to a second position where it is coupled to the second rotary input member, and a synchronizing mechanism for synchronizing the rotational speed of the rotary output member with the rotational speed of the second rotary input member while the rotary output member moves from its first position toward its second position at a variable shift velocity, which steps comprise:

moving the rotary output member from the first position to a neutral position at a first shift velocity, the neutral position having a velocity less than a synchronization shift velocity and defining a neutral position velocity, wherein the synchronization shift velocity corresponds to the shift velocity at which rotational speed synchronization between the second rotary input member and the rotary output member occurs;

moving the rotary output member from the neutral position to a synchronization position at a second shift velocity substantially equal to the synchronization shift velocity; and moving the rotary output member from the synchronization position to the second position at a third shift velocity that is greater than the synchronization shift velocity.

23. The method of claim 22, wherein the first shift velocity varies between a maximum shift velocity at which the gear system can move the rotary output member and a shift velocity less than the synchronization shift velocity.

24. The method of claim 22, wherein the second shift velocity varies between the neutral position velocity and the synchronization shift velocity.

25. The method of claim 22, wherein the third shift velocity varies between the synchronization shift velocity and a maximum shift velocity at which the gear system can move the rotary output member.

26. The method of claim 22, wherein the neutral position substantially coincides with a position at which the synchronizing mechanism first begins synchronizing the rotational speed of the second rotary input member with that of the rotary output member.

27. The method of claim 22, wherein the neutral position substantially coincides with a position at which the rotary output member first becomes fully disengaged from the first rotary input member.

28. The method of claim 22, wherein the location of the second position is established by means of mechanical detents.

29. A method for performing a synchronized gear shift of a gear system comprised of a first rotary input member, a second rotary input member, a rotary output member movable from a first position where it is coupled to the first rotary input member to a second position where it is coupled to the second rotary input member and a synchronizing mechanism for synchronizing the rotational speed of the rotary output member with the rotational speed of the second rotary input member while the rotary output member moves from its first position toward its second position at a variable shift velocity, which steps comprise:

accelerating the rotary output member over a first shift interval, from an initial shift velocity to a first shift velocity;

decelerating the rotary output member over a second shift interval, from the first shift velocity to a second shift velocity;

accelerating the rotary output member over a third shift interval, from the second shift velocity to a third shift velocity;

accelerating the rotary output member over a fourth shift interval, from the third shift velocity to a fourth shift velocity; and decelerating the rotary output member over a fifth shift interval, from the fourth shift velocity to a final shift velocity.

30. The method of claim 29, wherein the initial shift velocity is substantially equal to zero.

31. The method of claim 29, wherein the first shift velocity is greater than a synchronization shift velocity, wherein the synchronization shift velocity corresponds to the shift velocity of the rotary output member during the period in which rotational speed synchronization between the second rotary input member and the rotary output member occurs.

32. The method of claim 29, wherein the second shift velocity is less than a synchronization shift velocity, wherein the synchronization shift velocity corresponds to the shift velocity of the rotary output member during the period in which rotational speed synchronization between the second rotary input member and the rotary output member occurs.

33. The method of claim 29, wherein the third shift velocity is substantially equal to a synchronization shift velocity, wherein the synchronization shift velocity corresponds to the shift velocity of the rotary output member during the period in which rotational speed synchronization between the second rotary input member and the rotary output member occurs.

34. The method of claim 29, wherein the fourth shift velocity is greater than a synchronization shift velocity, wherein the synchronization shift velocity corresponds to the shift velocity of the rotary output member during the period in which rotational speed synchronization between the second rotary input member and the rotary output member occurs.

35. The method of claim 29, wherein the final shift velocity is less than a synchronization shift velocity, wherein the synchronization shift velocity corresponds to the shift velocity of the rotary output member during the period in which rotational speed synchronization between the second rotary input member and the rotary output member occurs.

36. The method of claim 29, wherein the second and third shift velocities are substantially equal.

37. The method of claim 29, wherein the final shift velocity is substantially equal to zero.

38. The method of claim 29, wherein the first shift velocity is substantially equal to a maximum shift velocity at which the gear system can move the rotary output member.

39. The method of claim 29, wherein the fourth shift velocity is substantially equal to a maximum shift velocity at which the gear system can move the rotary output member.

* * * * *